Nov. 18, 1958  R. M. MERO  2,860,592
OVERLOAD CONTROL CAM INSERT
Filed May 4, 1954  7 Sheets-Sheet 1

INVENTOR
Ralph M. Mero
BY
ATTORNEYS

Nov. 18, 1958     R. M. MERO     2,860,592
OVERLOAD CONTROL CAM INSERT
Filed May 4, 1954     7 Sheets-Sheet 7

INVENTOR
Ralph M. Mero
BY
ATTORNEYS

United States Patent Office 2,860,592
Patented Nov. 18, 1958

2,860,592
OVERLOAD CONTROL CAM INSERT

Ralph M. Mero, Chicago, Ill., assignor to Continental Can Company, New York, N. Y., a corporation of New York Application May 4, 1954, Serial No. 427,637

18 Claims. (Cl. 113—1)

The invention relates generally to can manufacture and more particularly to the making of the can end closures which are affixed to the can bodies, and it primarily seeks to provide a novel overload release means including a yieldable cam section forming a part of the means for actuating dies employed in certain shaping operations on the can ends.

While the invention is adaptable to many other applications, the herein disclosed example of adaptation has to do with the shaping of previously formed can ends to adapt them for resting on can bodies in slightly spaced relation to the conventionally flanged mouths of the cans so that the interiors of the cans may be subjected to a differential pressure treatment, such as vacuumizing or gassing, while the can ends are in place prior to the final sealing of the cans. In order to accomplish this purpose the can ends are fed into a machine having rotary carrier means whereon die heads are opposed in position for receiving the can ends between them, cam means being included for pressing the die heads together and then again separating them, and the die heads having cooperating opposed surfaces for reshaping the can ends in the manner desired, and the invention resides in providing in said cam means a section disposed at the cam portion engaged while the final shaping of a can end is being effected and which is normally effective to place the dies to properly reshape single can ends, but which is yieldable or movable away whenever superposed or abnormally thick or bent can ends are presented between the dies so as to prevent jamming and breakage of machine parts.

An object of the invention is to provide an apparatus of the character stated wherein the yieldable cam section is mounted for sliding movement in a direction perpendicular to the thrust applying surface of the cam and has its movement away from its normal position resisted by spring means which is strong enough to hold the cam section in its normal position during engagement of all single and normal can ends between the dies, but which will yield and permit the cam section to move away from its normal position whenever a die engages the same when there is an abnormally thick or bent can end or superposed can ends between said die and its opposing or cooperating die.

Another object of the invention is to provide an apparatus of the character stated wherein the yieldable cam section is opposed by a back-up block, there being included a rod traversing the space between the cam section and said block, two heads surrounding said rod, one connected to be movable endwise with the rod and the other being relatively slidable on the rod, an abutment on the rod and opposed by the slidable head, a compression spring surrounding the rod between the abutment and the slidable head opposing the same, and toggle bar means engaging between the yieldable cam section and both heads, and between the back-up block and both heads and disposed to be effective to force the heads apart against the compression of the spring whenever an overload on the yieldable cam section overcomes the position retaining resistance of the spring.

Another object of the invention is to provide an apparatus of the character stated wherein the abutment is adjustably mounted on the traversing rod so that the compression of the spring, and therefore the resistance to yielding of the cam section, can be varied.

Another object of the invention is to provide an apparatus of the character stated wherein the can ends are shaped between sets of opposed die heads mounted in equidistantly spaced relation on and about rotor means, at least one die head of each set being slidably mounted and having follower means engaged with a stationary cam which includes the yieldable cam section.

Another object of the invention is to provide an apparatus of the character stated wherein the stationary cam is secured to a back-up plate which also supports the yieldable cam section and the toggle bar and spring means which yieldably oppose movement of said cam section.

Another object of the invention is to provide an apparatus of the character stated wherein movement of the traversing rod upon yielding movement of the yieldable cam section is utilized to actuate a switch in a control circuit for stopping the operation of the apparatus.

Another object of the invention is to provide an apparatus of the character stated wherein the back-up plate to which the stationary cam is secured, and which also supports the yieldable cam section and the overload release means is adjustably supported on a frame base portion, the rotor means carrying the slidable die heads being splined on a driver shaft having bearing in a sleeve which is slidable in a supporting bearing and is secured to the back-up plate, means also being included for adjusting the sleeve along the shaft to alter the position of the connected cam, back-up plate, overload release means, and also the rotor connected by follower means to said cam, and the die heads carried by said rotor.

With the above and other objects in view that will hereinafter appear, the nature of the invention will be more clearly understood by reference to the following detailed description, the appended claims and the several views illustrated in the accompanying drawing.

Figure 1:
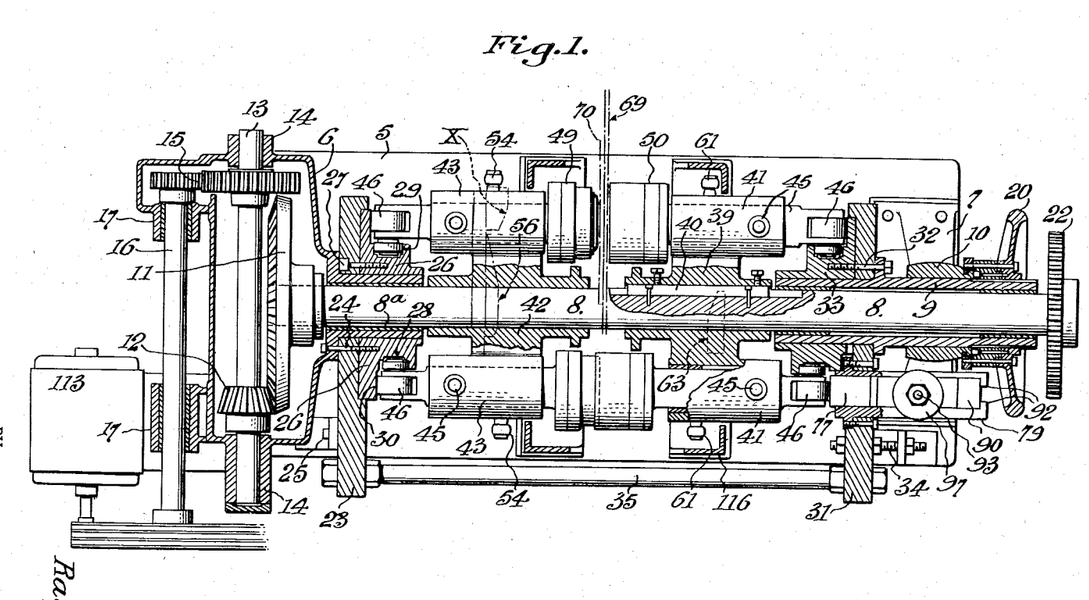
Figure 1 is a plan view and part horizontal section illustrating a can end reshaping machine embodying the invention.

In the example of embodiment of the invention herein disclosed, the apparatus is shown as including a frame structure having a base or bed portion 5 whereon is rigidly supported a gear housing 6 at one end thereof, and a bearing casting 7 at the other end thereof. A shaft 8 is horizontally rotatable in a bearing 8a provided therefor in the gear housing, and a sleeve bearing 9 supports the shaft at its other end and is slidable in a supporting bearing 10 on the bearing casting 7. The shaft 8 has a large bevel gear 11 fixed thereon, and the same is driven by a small bevel pinion 12 secured on a cross shaft 13 which is rotatable in bearings 14 provided therefor in the gear housing 6. The shaft 13 is driven through a spur gear couple 15 from a driver shaft 16 which is rotatable in bearings 17 provided therefor on the gear housing 6 and which is driven through pulley and belt means from a motor as illustrated in Figure 1.

Figure 4:
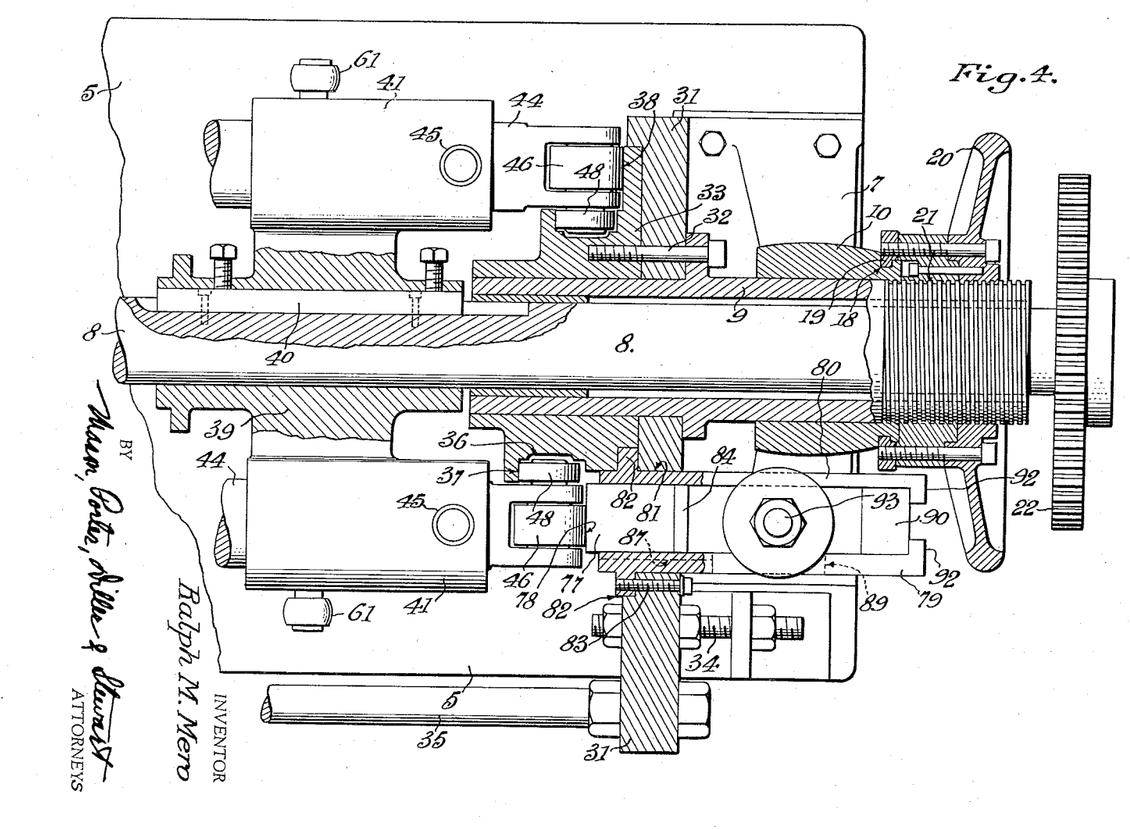
Figure 4 is an enlarged horizontal sectional view of the parts shown in Figure 2, the section being taken along the axis of the rotor fragment.
Figure 5:
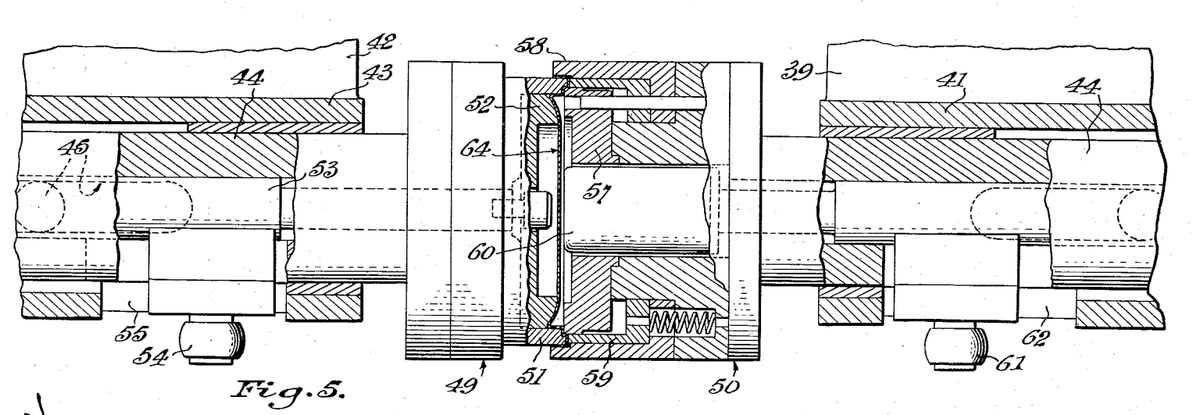
Figure 5 is an enlarged fragmentary part plan and part horizontal sectional view illustrating opposing, can end reshaping die heads.

It will be apparent by reference to Figure 4 of the drawings that the bearing 10 has an annular groove 18 therein in which to rotatably receive the ring rib 19 secured to the hand wheel 20 which is threadably mounted at 21 on the sleeve 9. By turning the captive hand wheel 20 the sleeve 9 and all parts connected thereto or mounted thereon as hereinafter described may be shifted along the shaft 8.

The shaft 8 also has a driver gear 22 secured thereon, the purpose of which will be described hereinafter.

A back-up plate 23 is rigidly secured as at 24 on the gear housing 6, and at 25 on the frame bed 5, and a cam 26 is secured as at 27 to said back-up plate about the bearing 8a. The cam has a groove 28 presenting a slide retracting surface 29 and an extension surface 30 providing a thrust imparting face.

Another back-up plate 31 is secured at 32 on the sleeve 9 and to a cam 33 surrounding said sleeve. The back-up plate 31 is adjustably secured as at 34 on the frame bed 5 and is secured in rigidly spaced relation to the other back-up plate 23 by tie rods 35. The cam 33 also has a groove 36 presenting a slide retracting surface 37 and an extension surface 38 providing a thrust imparting face. See Figures 1 and 4.

A rotor 39 is splined on the shaft 8 as at 40 and is equipped with six slide bearings 41 equidistantly spaced thereabout with the bearing axes paralleling the shaft axis. A second rotor 42 is keyed on the shaft 8 in spaced relation to the rotor 39 and it also has six slide bearings 43 aligned with the slide bearings of the other rotor. Each of the twelve slide bearings 41 and 43 has a slide 44 reciprocable therein and held against movement about its axis by key means generally designated 45. Each slide also has a forked outer end portion in which a thrust receiving follower roller 46 is mounted on a cross pin 47, and each cross pin also carries an offset roller 48 to engage the slide retraction effecting groove surface of the respective cam. A male can end engaging head 49 is carried by each slide of the rotor 42, and a female can end engaging head 50 is carried by each slide of the rotor 39. It is to be understood that the rotors 39 and 42 turn with the shaft 8 and that the die heads are reciprocated toward and from each other as the rotors are rotated. The contacting of the die heads with the preshaped can ends between them serve to reshape the can end flanges and provide sealing compound receiving channels therein, and also to emboss ribs radially traversing the formed channel and which are engageable with can body flanges in a manner for holding the can ends slightly spaced above the bodies so as to permit differential pressure treatment of the cans, either vacuumizing or gassing the interiors thereof.

Each male die head 49 includes a can end heel receiving and flange shaping cup 51 and an independently reciprocable knock-out pad 52, the latter being mounted on a carrier 53 which is reciprocable along the axis of the slide. The carrier 53 is equipped with a follower 54 which projects radially through a longitudinal slot 55 in the respective rotor bearing for actuating engagement by cam means generally designated 56 and X for at proper times advancing the pad 52 for purposes to be described hereinafter.

Figure 6:
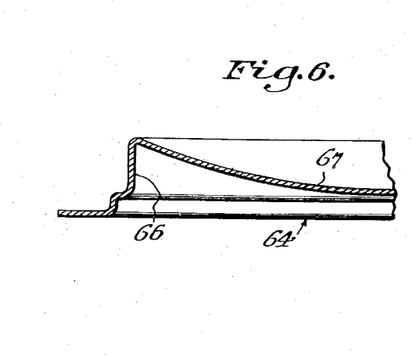
Figures 6 and 7 are enlarged radial sectional views of one of the can ends, the flange being shown in its initial condition of extension prior to the channel and channel rib shaping in Figure 6, and the reshaped or completed condition being shown in Figure 7.
Figure 7:
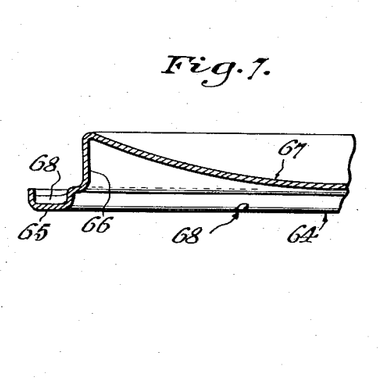
Figure 8:
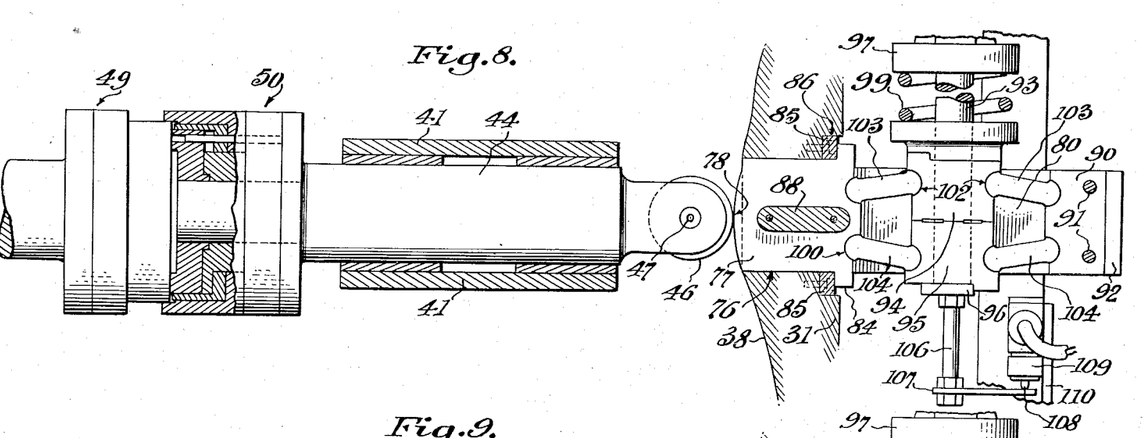
Figures 8 and 9 are somewhat diagrammatic views partly in side elevation and developed vertical longitudinal section and respectively illustrating the normal and the overload relieving positions of the parts as a can end reshaping unit is passing over the high point of the cam.
Figure 9:
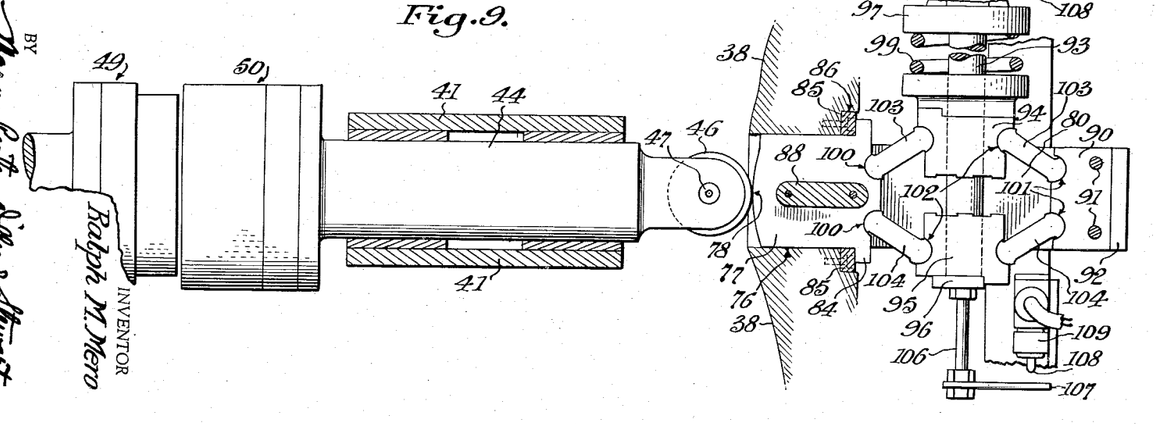
Figure 10:
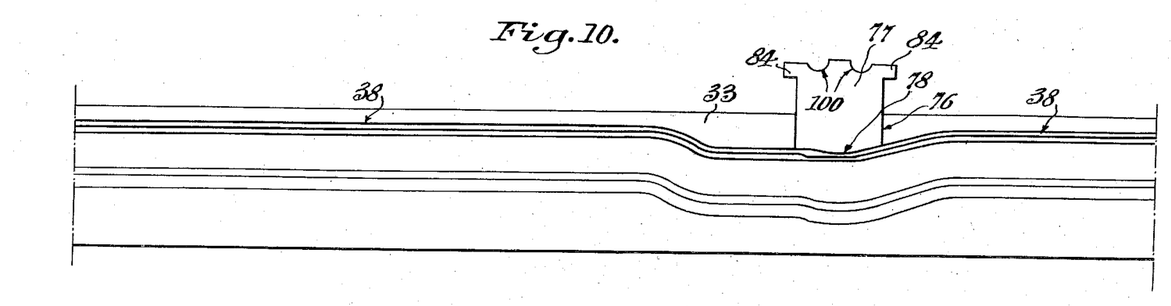
Figure 10 is a development of the cam equipped with yieldable insert section, said section being shown in place in the cam clearance.

Each female die head 50 includes an inner heel contacting plug 57, an outer flange turning cup 58, a spring pressed sleeve 59 slidable in the annular space between the parts 57 and 58, and a central, longitudinally reciprocable end gripper pad 60. The pad is equipped with a follower 61 projecting radially through a longitudinal slot 62 in the respective bearing 41 and engageable with cam means generally designated 63 and which is effective at the proper time to project the pad to engage the can end placed in position by the can end feed-in means and press and hold the same against the opposing die head. A can end 64 is shown in radial section in Figures 6 and 7, and in its reshaped or completed condition includes the sealing compound receiving channel 65, the stepped heel 66 and the domed central body portion 67. The channel traversing indentations or embossed ribs which serve to hold the can end in spaced relation to the body flange in the manner previously stated are indicated at 68. As before stated, the can end referred to herein is shaped initially with its flange extending radially outward as indicated in Figure 6, or in other words without the peripheral curl completing the channel 65 and the embossed ribs 68. While this particular form of can end is illustrated herein as an example of embodiment of the invention, it is to be understood that the overload control means shown and claimed herein may be employed incidental to the initial shaping or reshaping of other forms of can ends, or other comparable articles.

Figure 3:
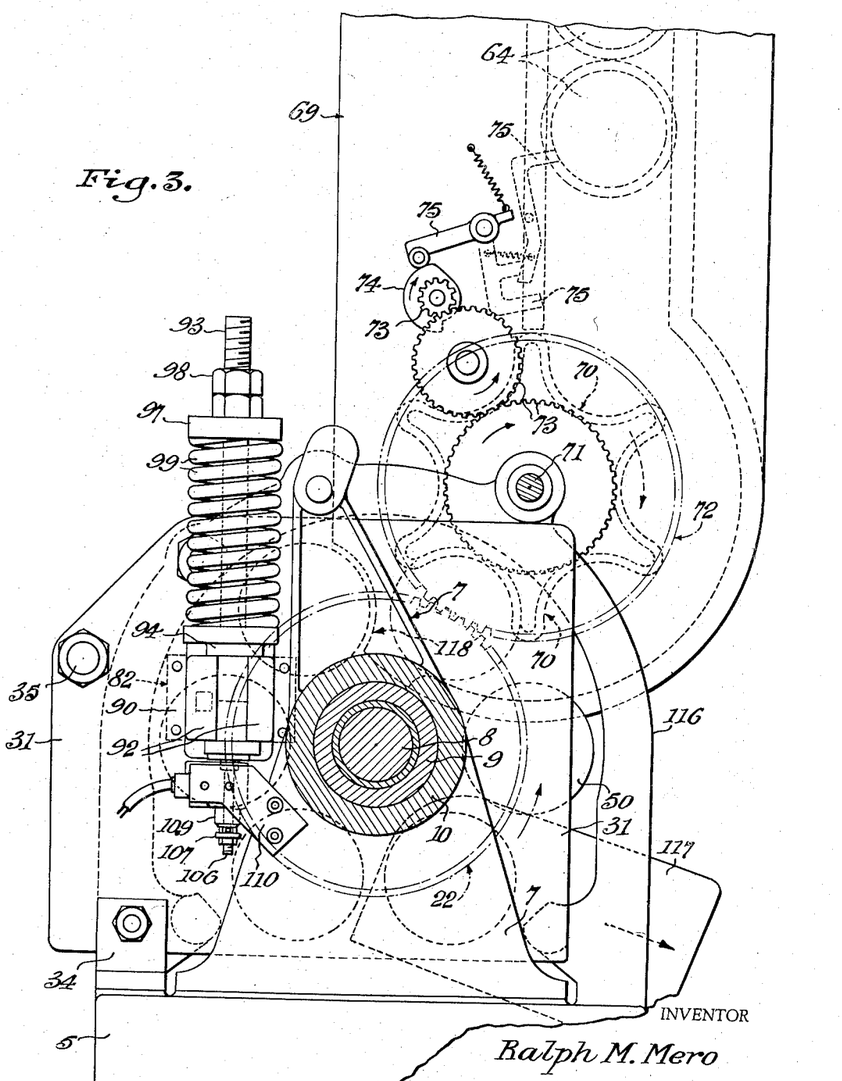
Figure 3 is an end elevation of the parts shown in Figure 2.

The means for feeding can ends individually into position between the opposing die heads 49 and 50 of the serially presented sets is somewhat diagrammatically illustrated in Figures 1 and 3. This means may include a pocketed turret 70 mounted on the shaft 71 having a gear 72 secured thereon and driven by the previously mentioned gear 22 on the rotor shaft 8.

The shaft 71 imparts rotation to the turret 70 and also, through the gear train 73 to the rotary cam 74 which operates the escapement devices generally designated 75 to drop the can ends 64 one by one into the serially presented pockets of the turret 70 so that they will in turn be presented by said pockets into position for being picked up between the opposing die heads 49 and 50 of the rotor carried die head sets in a manner to be described hereinafter.

The thrust imparting surface portion 38 of the cam 33 has a slideway or clearance 76 formed therein, (see Figures 2 and 8 to 10), and in this slideway a cam section 77 has a snug sliding fit. It will be noted that the cam section has a cam crest contour at 78, and the effective portion of the cam section when normally presented forms a smooth continuation of the thrust imparting surface extension of the cam 33. It will be apparent by reference to Figures 2, 4, 8 and 9 of the drawings that the cam section 77 is slidable between two parallel support plates 79 and 80 which are mounted in a receiving aperture 81 in the back-up plate 31 and have outwardly directed mounting flanges 82 abutting and secured at 83 to the plate 31. The cam section 77 is equipped with upwardly and downwardly projecting abutment shoulders 84 which abut placer bars 85 removably secured in the receiving recesses 86 formed in the back-up plate 31. The support plate 79 has an inwardly directed keyway 87 for slidably receiving the key 88 which is secured to the cam section 77. If desired, the keyway 87 may merge into a sight opening 89.

A back-up block 90 is secured at 91 between the plates 79 and 80, and said plates also have inwardly turned abutment flanges 92 engaged by the block 90 and supporting the same against endwise thrusts tending to displace it from its position between the plates 79 and 80. An upright cross rod 93 traverses the space between the plates 79 and 80, and between the back-up block 90 and the yieldable cam section 77, and within said space two separable blocks 94 and 95 surround said rod and have laterally flat faces slide guided by the plates 79 and 80. The lower end of the rod 93 is secured at 96 to the block 95 so as to be movable therewith, and the upper block 94 is slidable on the traversing rod. The rod carries an abutment head 97 at its upper end, the same being adjustably secured as at 98 on said rod, and a heavy compression spring 99 is coiled about the rod between the head 97 and the block 94 and yieldably presses said block against the companion block 95 at a point approximating a central position between the plates 79 and 80 or along the line of yielding movement of the cam section 77, this being the line along which the major thrust is imparted to the rotor slides as they are passing the can end reshaping cam crest portion.

Fulcrum recesses 100 are provided in the yieldable cam section 77, and similar recesses 101 are provided in the back-up block 90. Similar fulcrum recesses 102 are provided in the oppositely directed faces of each of the blocks 94 and 95. It will be apparent by reference to Figure 2 that the fulcrum recesses receive the rounded ends of an upper pair of toggle bars 103 and a lower pair of toggle bars 104. The toggle bars 103 of the upper pair are angled slightly downwardly from the fulcrum recesses of the upper block 94, and the lower pair of toggle bars 104 are angled slightly upwardly from the recesses of the lower block 95. By reason of this positioning or slanting of the upper and lower pairs of toggle bars, inward movement of the cam section 77 occasioned by an overload resulting from the jamming of a faulty can end or superposed can ends between opposing die heads will cause the blocks 94 and 95 to separate, the block 94 moving upwardly, and the block 95 and the attached rod 93 moving downwardly against the compression of the spring 99. Access apertures 105 may be provided in the support plates to permit lubrication of the fulcrum ends of the toggle bars.

Figure 2:
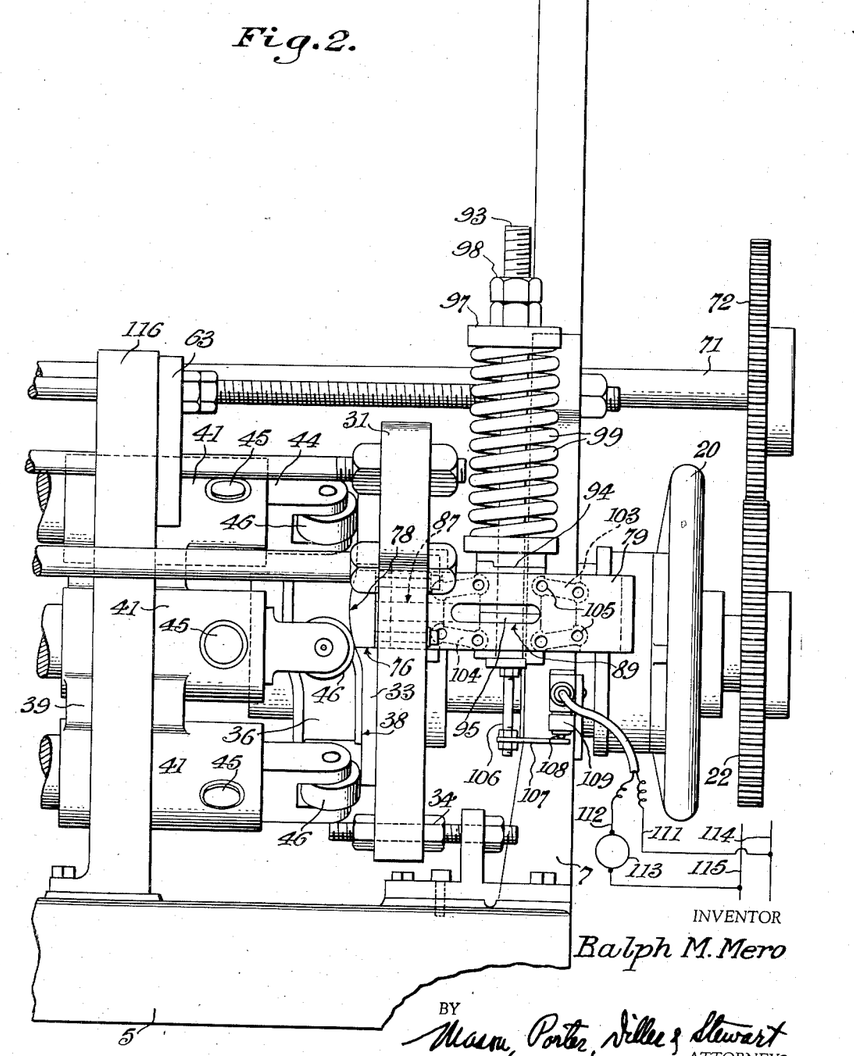
Figure 2 is an enlarged fragmentary side elevation illustrating the overload control means, parts being broken away and in section.

A switch actuator rod 106 is secured to and depends from the lower end of the traversing rod 93 and carries a laterally projecting actuator plate 107 in position for actuating the button 108 of a switch 109 which is supported on the bracket 110 secured to the bearing casting 7 in the manner illustrated in Figures 2 and 3 of the drawings. The rod 106 and the plate 107 thus comprise switch actuator means movable with the traversing rod 93. The switch 109 is connected by conductors 111 and 112 with the motor 113 forming a part of the machine driving devices previously referred to and with the power lines 114 and 115 which serve said motor. It is to be understood that the switch 109 is a normally open or circuit breaking switch, the same being held closed by the overload resisting spring 99 and the traversing rod carried plate 107. Whenever the slidable cam section 77 is displaced by an overload in the manner stated and the blocks 94 and 95 are separated to impart downward movement to the rod 93 resisted by the compression spring 99, the plate 107 will be moved away from the switch button 108 and the switch will be permitted to open and break the motor service circuit so as to stop the machine.

It is to be understood that the knock-out pad and gripper pad advancing cams 56 and 63 are mounted in positions for being encountered by the followers 54 and 61 respectively during travel through the upper portions of the rotor travel path. The supporting of the cam means 63 on one of the frame pieces 116 is shown in Figure 2 and the other cams 56 and X may be similarly supported, the latter, however, being disposed for engagement by the followers 54 after they have passed around the bottom of the rotor travel arc, thereby to assure that when said cam X functions to project the knock-out pads 52 to eject reshaped can ends from the die heads 49, said can ends will be delivered through the discharge chute 117 shown in Figure 3.

In the operation of the machine herein disclosed as an example of embodiment of the improved overload control means the opposing die head carrying slides 44 will be reciprocated by the cams 26 and 33 during rotation of the carrying rotors to properly move the male and female die heads 49 and 50 of the opposing sets toward and from each other to receive, then reshape and then release the can ends 64 which are serially presented thereto by the feed-in means best shown in Figure 3.

The ratios of the respective gear couples 22, 72 and 73 are such that the continuously rotated can end timing turret 70 will present a can end in position between the opposing die heads 49—50 of each set as it comes into alignment with a turret pocket in the manner illustrated in Figure 3, and a can end will be dropped into each turret pocket as it comes into alignment with the upright feedway through which the can ends fall. There are six pockets in the turret 70 and the cam 74 is rotated six times for each complete rotation of the turret 70, thereby serving to actuate the escapement devices 75 to control the dropping of the can ends in the manner stated.

Figure 11:
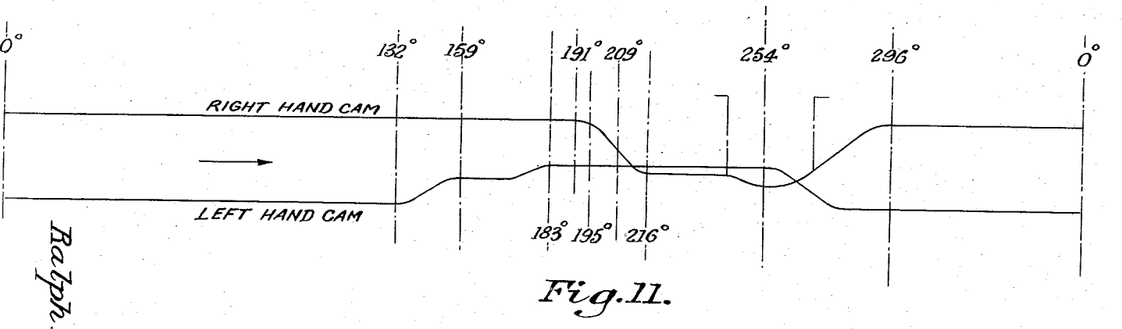
Figure 11 is a timing diagram showing the relation of the actions of the die head actuating cams.

The timing of the die head operations is diagrammatically illustrated in Figure 11. As each die head set reaches the can end receiving position, with its die heads 49—50 separated, the respective follower 54 will engage the advancing cam 56 to cause the pad 52 to engage the can end while it is still centered in the turret pocket and opposed by the back-up plate 69. Then as the can end passes off the back-up plate 69, at 118, the respective follower 61 is acted on by the cam 63 to project the gripper pad 60 in the head 50 to engage the can end and hold it against the pad 52. Thereafter the reshaping of the can end takes place. The application of the gripper pad is completed at the 195° point as diagrammatically indicated on Figure 11, and advancement of the head 50 commences just prior to this point, the ring 59 of said head engaging the clamped can end flange at the 209° point. The gripping action of the pad 60 terminates just after the ring 59 contacts the can end, and continued telescoping of the die ring 58 over the male die ring 51, completed at the 254° point, serves to shape the edge extremity of the can end flange to form the desired sealing compound receiving channel, and to fully seat the ring 59 in its radial rib embossing position. This is the time at which an overload caused by engagement of the opposing die heads with an abnormally thick or bent can end, or superposed can ends would bring about a yielding or displacement of the cam section 77 and a stopping of the machine in the manner previously described.

Beyond this point the cams 26 and 33 serve to move the die heads 49—50 apart, and the ejector cam X will be engaged by the respective follower 54 to project the knock-out pad 52 and bring about a discharging of the can end into the discharge chute 117.

It is to be understood that the invention herein claimed resides in the overload release means best shown in Figures 2, 3, 4, 8 and 9, and that the particular forms of die heads herein described are but examples of structures wherein the overload sought to be released or relieved may be encountered. The novel overload release devices herein claimed may be employed in conjunction with various forms of die heads and in other combinations comparable to the example arrangement disclosed herein.

While one form of the invention has been shown for purposes of illustration, it is to be clearly understood that various changes in the details of construction and arrangement of parts may be made without departing from the spirit and scope of the invention as defined in the appended claims.

I claim:

1. In apparatus of the character described, a carrier, a die head support slidable on said carrier, a first die head mounted on said support, a second die head mounted on the carrier in opposition to said first die head, said die heads having complementary opposing surfaces effective when the die heads are brought together by movement of the slidable support to reshape portions of can ends placed between the die heads, cam means engageable by the support for imparting movement to said first die head to bring it against a can end placed between it and the second die head, means for bringing about relative movement between said carrier and the cam means in a direction perpendicular to the direction of sliding movement of said support for imparting the sliding movement to the slidable support, said cam means including a movable section in the portion thereof effective when in normal position to press the slidable die head against a can end, and means yieldably holding said cam section in its normal position during engagement of the slidable support carried first die head with a normal can end but permitting said section to move away upon imposition of an overload such as by the engagement of said first die head with an abnormally thick or bent can end or superposed can ends.

2. Apparatus as defined in claim 1 wherein there is included a driving motor, and a control circuit therefor including a switch and actuating means therefor operatively connected with the cam section to be operable upon movement of the cam section out of its normal position upon imposition of an overload thereon for breaking said circuit and stopping the motor.

3. Apparatus as defined in claim 1 wherein the carrier comprises a rotatable rotor and the cam means comprises a stationarily mounted cam.

4. Apparatus as defined in claim 1 wherein the carrier comprises a rotatable rotor and the cam means comprises a stationarily mounted cam and wherein there is included a driving motor, and a control circuit therefor including a switch and actuating means therefor operatively connected with the cam section to be operable upon movement of the cam section out of its normal position upon imposition of an overload thereon for breaking said circuit and stopping the motor.

5. Apparatus as defined in claim 1 wherein is included a common support for the cam and the means for yieldably holding the cam section in its normal position, and means for imparting movement of adjustment to the support, the cam and said holding means.

6. In apparatus of the character described, a carrier rotor means, a plurality of cooperating die head sets equidistantly spaced about the rotor means and each including a die head slidable on the rotor means and opposed by a cooperating die head, the die heads of each set having complementary opposing surfaces effective when the die heads are brought together to reshape portions of can ends placed between them, cam follower means projecting from each said slidable die head, a stationary cam engaged by all of said followers and effective to impart sliding movement thereto, said cam including a movable section in a portion thereof effective when in normal position to engage the followers and press each slidable die head against a can end placed between it and the cooperating die head, and means yieldably holding the cam section in its normal position during engagement of the slidable die heads with all normal can ends but permitting said cam section to move away upon imposition of an overload such as by the engagement of a slidable die head with an abnormally thick or bent can end or superposed can ends.

7. Apparatus as defined in claim 1 wherein the yieldable cam section is mounted for movement in a direction generally perpendicular to the thrust applying surface of the cam and has its movement away from its normal position resisted by a spring means which is strong enough to hold the cam section in its normal position during engagement of all single and normal can ends between the die heads, but which will yield and permit the cam section to move away from its normal position whenever a die head engages an abnormally thick or bent can end or superposed can ends, there being included also limiting stop means effective to place the cam section as a smooth continuation of the effective thrust imparting surface of the cam when said section is in its normal position.

8. Apparatus as defined in claim 1 wherein the yieldable cam section is mounted for movement in a direction generally perpendicular to the thrust applying surface of the cam, and wherein the means for yieldably holding the cam section includes a rigidly supported back-up block spaced from the cam section, a rod traversing the space between the cam section and said block, two blocks surrounding the rod and abutting in said space, compression spring means surrounding the rod and constantly tending to hold said two blocks in said abutting relation, and toggle members interposed between the cam section and said two blocks and between said two blocks and said back-up block and effective when the cam section is moved upon imposition of an overload thereon to move said two blocks apart against the compression of the spring means.

9. Apparatus as defined in claim 1 wherein the yieldable cam section is mounted for movement in a direction generally perpendicular to the thrust applying surface of the cam, and wherein the means for yieldably holding the cam section includes a rod traversing said generally perpendicular line of cam section movement, two blocks surrounding the rod and lying at opposite sides of said generally perpendicular line, compression spring means surrounding the rod and constantly tending to hold said two blocks in normal opposing position, toggle members interposed between the cam section and said two blocks and effective when the cam section is moved upon imposition of an overload thereon to move said two blocks apart against the compression of the spring means, and means preventing movement of said blocks in the direction of the yielding movement of the cam section.

10. Apparatus as defined in claim 1 wherein the yieldable cam section is mounted for movement in a direction generally perpendicular to the thrust applying surface of the cam, and wherein the means for yieldably holding the cam section includes a rod traversing said generally perpendicular line of cam section movement, two blocks surrounding the rod and lying at opposite sides of said generally perpendicular line, compression spring means surrounding the rod and constantly tending to hold said two blocks in normal opposing position, two toggle members one engaging between one block and the movable cam section and the other between the other block and said cam section, said toggle members being arranged in flared relation to said generally perpendicular line of movement of the cam section so as to be effective when the cam section is moved upon imposition of an overload thereon to move said two blocks apart against the compression of the spring means, and means preventing movement of said blocks in the direction of the yielding movement of the cam section.

11. Apparatus as defined in claim 1 wherein the yieldable cam section is mounted for movement in a direction generally perpendicular to the thrust applying surface of the cam, and wherein the means for yieldably holding the cam section includes a rigidly supported back-up block spaced from the cam section, a rod traversing the space between the cam section and said block, two blocks surrounding the rod and abutting in said space, compression spring means surrounding the rod and constantly tending to hold said two blocks in said abutting relation, a set of two toggle members interposed between the cam section and said two blocks, and another set of two toggle members interposed between said two blocks and said back-up block, the toggle members of each of said set being arranged in flared relation to said generally perpendicular line of movement of the cam section and from the back-up block toward said two blocks and from said cam section toward said two blocks respectively so as to be effective when the cam section is moved upon imposition of an overload thereon to move said two blocks apart against the compression of the spring means.

12. Apparatus as defined in claim 10 in which there is included a driving motor, and a control circuit therefor including a switch operable by movement of one of said blocks for breaking said circuit and stopping the motor.

13. Apparatus as defined in claim 1 wherein the carrier comprises a rotatable rotor and the cam is stationarily mounted, and wherein is included a common support for the cam and the means for yieldably holding the cam section in its normal position, and means for imparting movement of adjustment to the rotor, the cam and said holding means.

14. Apparatus as defined in claim 1 wherein the carrier comprises a rotatable rotor and a shaft on which the rotor is splined, and there being included follower means connecting the slidable die head with the cam, a fixed bearing, a sleeve bearing for the shaft slidable in the fixed bearing, a back-up plate forming a stationary support for the cam and the sleeve bearing, and a hand wheel having a captive ring and groove connection with the fixed bearing and threaded on the sleeve bearing so that rotation of the hand wheel will impart longitudinal movement of adjustment to the back-up plate, the sleeve bearing, the cam and the rotor.

15. Apparatus as defined in claim 1 wherein the carrier comprises a rotatable rotor and the cam is stationarily mounted, and wherein is included a common support for the cam and the means for yieldably holding the cam section in its normal position, and means for imparting movement of adjustment to the rotor, the cam and said holding means, said holding means including a rigidly supported back-up block spaced from the cam section, a rod traversing the space between the cam section and said block, two blocks surrounding the rod and abutting in said space, compression spring means surrounding the rod and constantly tending to hold said two blocks in said abutting relation, and toggle members interposed between the cam section and said two blocks and between said two blocks and said back-up block and effective when the cam section is moved upon imposition of an overload thereon to move said two blocks apart against the compression of the spring means.

16. Apparatus as defined in claim 6 in which the means for yieldably holding the cam section includes a rigidly supported back-up block spaced from the cam section, a rod traversing the space between the cam section and said block, two blocks surrounding the rod and abutting in said space, compression spring means surrounding the rod and constantly tending to hold said two blocks in said abutting relation, and toggle members interposed between the cam section and said two blocks and between said two blocks and said back-up block and effective when the cam section is moved upon imposition of an overload thereon to move said two blocks apart against the compression of the spring means.

17. Apparatus as defined in claim 1 wherein the yieldable cam section is mounted for movement in a direction generally perpendicular to the thrust applying surface of the cam, and wherein the means for yieldably holding the cam section includes a rigidly supported back-up block spaced from the cam section, a rod traversing the space between the cam section and said block, two blocks surrounding the rod and abutting in said space, means securing one said abutting block to the rod, an abutment on the rod and spaced from said other abutting block, a compression spring surrounding the rod and engaging at its end with the abutment and said other abutting block and constantly tending to hold the abutting blocks in engagement, and toggle members interposed between the cam section and said two blocks and between said two blocks and said back-up block and effective when the cam section is moved upon imposition of an overload thereon to move said two abutting blocks apart against the compression of the spring, there being also included a driving motor, a control circuit therefor including a stationarily supported switch, and switch actuator means movable with the rod upon imposition of an overload on the cam section effective to move it out of its normal position to control the switch in a manner for breaking the control circuit and stopping the motor.

18. Apparatus as defined in claim 1 wherein the yieldable cam section is mounted for movement in a direction generally perpendicular to the thrust applying surface of the cam, and wherein the means for yieldably holding the cam section includes a rigidly supported back-up block spaced from the cam section, a rod traversing the space between the cam section and said block, two blocks surrounding the rod and abutting in said space, means securing one said abutting block to the rod, an abutment on the rod and spaced from said other abutting block, a compression spring surrounding the rod and engaging at its end with the abutment and said other abutting block and constantly tending to hold the abutting blocks in engagement, two toggle members, one engaging between one block and the movable cam section and the other between the other block and said cam section, said toggle members being arranged in flared rotation to said generally perpendicular line of movement of the cam section so as to be effective when the cam section is moved upon imposition of an overload thereon to move said two blocks apart against the compression of the spring means, means preventing movement of said blocks in the direction of the yielding movement of the cam section, there being also included a driving motor, a control circuit therefor including a stationarily supported switch, and switch actuator means movable with the rod upon imposition of an overload on the cam section effective to move it out of its normal position to control the switch in a manner for breaking the control circuit and stopping the motor.

References Cited in the file of this patent

UNITED STATES PATENTS

| 1,055,418 | Rudolphi | Mar. 11, 1913 |
| 1,194,038 | Krummel | Aug. 8, 1916 |
| 1,800,526 | Higgins | Apr. 14, 1931 |
| 1,885,703 | Fink | Nov. 1, 1932 |
| 2,412,874 | Crane | Dec. 17, 1946 |
| 2,433,040 | Geist | Dec. 23, 1947 |
| 2,558,576 | Miller et al. | June 26, 1951 |